350-372
OR 3,655,265 SR

United States Patent
Hammond

[15] 3,655,265
[45] Apr. 11, 1972

[54] RESONANT PIEZOELECTRIC ACOUSTO-OPTIC LIGHT FILTER AND APPARATUS USING SAME

[72] Inventor: Donald L. Hammond, Los Altos Hills, Calif.
[73] Assignee: Hewlett-Packard Company, Palo Alto, Calif.
[22] Filed: Aug. 7, 1970
[21] Appl. No.: 61,950

[52] U.S. Cl. ..........................350/149, 350/150, 350/157, 350/161
[51] Int. Cl. ..........................................................G02f 1/24
[58] Field of Search.................350/149, 150, 157, 160–161; 331/94.5

[56] References Cited

UNITED STATES PATENTS

| | | | |
|---|---|---|---|
| 3,437,399 | 4/1969 | Eden | 350/161 |
| 3,562,414 | 2/1971 | Blum | 350/161 |
| 3,512,864 | 5/1970 | Haertling et al. | 350/150 |
| 3,524,145 | 8/1970 | Fowler | 331/94.5 |

OTHER PUBLICATIONS

Harris et al., " Acousto-Optic Tunable Filter" J. Opt. Soc. Am. Vol. 59, No. 6 (June 1969) pp. 744–747
Harris et al., " Electronically Tunable Acousto-Optic Filter" Appli. Phys. Lett. Vol. 15, No. 10 (Nov. 15, 1969) pp. 325–326

*Primary Examiner*—David Schonberg
*Assistant Examiner*—Paul R. Miller
*Attorney*—Roland I. Griffin

[57] ABSTRACT

An acousto-optic light filter is disclosed wherein a radio frequency electric field is employed to excite an acoustic wave in a piezoelectric optically anisotropic medium. The light to be filtered is collinearly diffracted on the acoustic wave to shift light of a first polarization and of a frequency related to the frequency of the acoustic wave, into light of a second polarization. The diffracted light is polarization analyzed to separate light of the second polarization from light of the first polarization. Piezoelectric birefringent crystals are employed for the optically anisotropic medium. Arrays of acoustic resonators are formed by energy trapping in crystalline slabs, such resonators being selectively addressed by applying electric fields to the crystalline slab at the resonant frequency of the selected acoustic resonator. Different overtone resonances of the acoustic resonators are excited to permit the filter to pass light of different frequencies either in time displaced intervals or simultaneously.

27 Claims, 13 Drawing Figures

Patented April 11, 1972

INVENTOR
DONALD L. HAMMOND

BY Roland I. Griffin
ATTORNEY

INVENTOR
DONALD L. HAMMOND

BY Roland J. Griffin
ATTORNEY

INVENTOR
DONALD L. HAMMOND
BY Roland D. Griffin
ATTORNEY

RESONANT PIEZOELECTRIC ACOUSTO-OPTIC LIGHT FILTER AND APPARATUS USING SAME

DESCRIPTION OF THE prior ART

Heretofore, acoustic resonators have been employed as the acousto-optic element of light filters. More particularly, in such prior art systems, light of a first polarization was collinearly diffracted from a radio frequency acoustic wave in a birefringent crystal to shift a light beam from a first polarization to a second polarization. The output light was then polarization analyzed to pass only light of the second polarization. The light of the second polarization had a frequency which was variable in accordance with variations in the frequency of the radio frequency acoustic wave within the crystal. Such electrically tunable acousto-optic filters have been tunable from 5,000 A to 7,500 A by varying the frequency of the radio frequency acoustic wave from 1,050 megahertz to 750 megahertz. Such a tunable acousto-optic filter is disclosed in an article entitled "Electronically Tunable Acousto-Optic Filter" appearing in the Applied Physics Letters, Volume 15, No. 10, of 15 November 1969, pages 325-326.

In such prior art acousto-optic devices, the acoustic wave was excited in the birefringent crystal by means of an acoustic transducer affixed to one end of the crystal. An optically reflective coating was provided on the end of the crystal at the interface between the crystal and the acoustic transducer. The light to be filtered was then passed through the crystal in a first direction, reflected from the coating, and passed out of the crystal traveling in the opposite direction. While this arrangement is suitable for certain filter applications, it is desirable to provide a resonant acousto-optic element wherein the light to be filtered passes through the acousto-optic device.

In another prior art acousto-optic light filter, the acoustic transducer was placed on the side of the crystal for producing an acoustic wave which was internally reflected from one face of the crystal longitudinally thereof to the opposite face. This acoustic transducer was not a resonant device and therefore required a greater amount of acoustic power to produce a given diffraction of the light being filtered. Such an acousto-optic filter is disclosed in an article entitled "Acousto-Optic Tunable Filter" appearing in the Journal of the Optical Society of America Volume 59, No. 6, of June 1969, pages 744-747.

It is also known from the prior art that a multitude of piezoelectric acoustic resonators can be formed in a single crystalline slab, such resonators being relatively closely spaced and tuned for frequencies of acoustic resonances which are within a fraction of a percent of each other without producing substantial coupling between the resonators. Acoustic energy is caused to be trapped in the region of each of the excited acoustic resonators without substantial propagation of acoustic energy between adjacent acoustic resonators. Such multiple acoustic resonators are disclosed in an article entitled "Energy Trapping and Related Studies of Multiple Electrode Filter Crystals" appearing in the Proceedings of the 17th Annual Frequency Control Symposium, pages 88-126 of May, 1963 and in an article entitled "Monolithic Crystal Filters" appearing in the 1967 I.E.E.E. International Convention Record, Part 2, pages 78-93.

SUMMARY OF THE INVENTION

The principal object of the present invention is the provision of an improved method and apparatus for filtering light and apparatus using same.

One feature of the present invention is the provision, in an acousto-optic light filter, of a piezoelectric material as the optically anisotropic medium in which an acoustic wave is excited to diffract light of a first polarization into light of a second polarization at an optical frequency related to the frequency of the acoustic wave.

Another feature of the present invention is the same as the preceding feature including the provision of a pair of spaced electrodes disposed adjacent to the piezoelectric optically anisotropic medium for applying a radio frequency potential across the piezoelectric optically anisotropic medium to excite the acoustic wave therein.

Another feature of the present invention is the same as the immediately preceding feature wherein one or more of the electrodes is optically transparent such that the light beam to be filtered passes into the piezoelectric optically anisotropic medium through the transparent electrode.

Another feature of the present invention is the same as any one or more of the preceding features wherein the piezoelectric optically anisotropic medium is a crystalline plate having a thickness dimensioned to provide a thickness mode of vibration at the frequency of the applied electric field employed to excite the resonant acoustic wave therein.

Another feature of the present invention is the same as the immediately preceding feature wherein the crystalline plate is dimensioned to have overtone thickness modes of vibration in different optical bands of the light beam to be filtered, such that by sequentially or simultaneously applying radio frequency electric fields at the different resonant frequencies corresponding to the overtone modes of vibration one or more of the optical bands corresponding to the overtone resonances are filtered by the filter.

Another feature of the present invention is the same as any one or more of the preceding features wherein a plurality of acoustic resonators are arrayed generally in a plane transverse to the direction of the light beam to be filtered, each of the acoustic resonators having a different acoustic resonance frequency such that one or more of the different acoustic resonators are addressable by means of applying radio frequency electric fields at one or more frequencies to the array, such frequencies corresponding to the resonant frequency of selected ones of the acoustic resonators for exciting resonance thereof.

Another feature of the present invention is the same as the immediately preceding feature wherein the acoustic resonators are formed in a common crystal plate arranged to provide cut-off regions of the plate surrounding each of the acoustic resonators to provide energy trapping in each of the excited acoustic resonators when excited by an electric field of the resonant frequency of the respective acoustic resonator.

Other features and advantages of the present invention will become apparent upon a perusal of the following specification taken in connection with the accompanying drawings.

DESCRIPTION OF THE PREFERRED EMBODIMENTS

Figure 1:
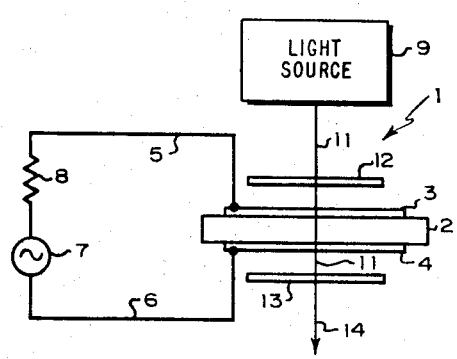
FIG. 1 is a schematic line diagram, partly in block diagram form, depicting an acousto-optic light filter incorporating features of the present invention.

Referring now to FIG. 1, there is shown an acousto-optic light filter 1 incorporating features of the present invention. The acousto-optic light filter 1 is similar to that disclosed in the aforecited article entitled "Acousto-Optic Tunable Filter" appearing in the Journal of the Optical Society of America, with the exception that the optically anisotropic medium is also piezoelectric and the acoustic wave is excited in the piezoelectric optically anisotropic medium by means of an electric field applied thereto. More particularly, the light filter 1 includes an optically anisotropic piezoelectric plate 2. Suitable piezo-electric optically anisotropic media include piezoelectric birefringent crystals, such as quartz or $LiNbO_3$. A pair of optically transparent electrodes 3 and 4 are disposed adjacent to the optically anisotropic piezoelectric plate 2 on opposite sides thereof. Suitable optically transparent electrodes 3 and 4 include relatively open wire grid structures or thin metallic coatings which are optically transparent, such as a coating of tin oxide deposited to a few thousand A in thickness.

A radio frequency potential is applied across the optically transparent electrodes 3 and 4 via leads 5 and 6 connected to a signal generator 7 having a source impedance 8. A source of light 9 is disposed to project a beam of light 11, to be filtered, through an input linear polarizer 12 for polarizing the light beam 11 in a first linear direction, such as the vertical direction. The polarized light beam is then passed through the optically transparent electrode 3 into the optically anisotropic piezoelectric plate 2 for collinear diffraction on an acoustic wave therein to shift the polarization of that portion of the incident light which is at an optical frequency related to the frequency of the acoustic wave by the relation of Equation (1), below, into light of a second polarization which is orthogonal to the direction of the first polarization. The diffracted output light beam 11 is then passed through a polarization analyzer 13, such as a linear polarizer polarized in the direction of the second polarization, such as the horizontal direction, such that the output of the polarization analyzer 13 comprises a beam 14 consisting only of that portion of the light of the input beam 11 which has been diffracted from the first polarization to the second polarization.

The acousto-optic light filter 1 of Figure 1 makes use of collinear acousto-optic diffraction in an optically birefringent medium. More particularly, an optically anisotropic piezoelectric crystal 2 is chosen with a crystal orientation such that the incident linearly polarized light beam 11 is diffracted on the acoustic wave from the input polarization into a second orthogonal polarization. For a given acoustic frequency, only a small range of light frequencies satisfies a momentum vector $k$ matching condition and is cumulatively diffracted. If the acoustic frequency is changed, the band of light frequencies which the acousto-optic element will diffract from the first polarization into the second polarization is changed. Diffraction into the second orthogonal polarization occurs, for quartz, via the $P_{14}$ photoelastic constant and is only cumulative if $|k_o| - |k_e| = |k_a|$ where the subscripts $_o$, $_e$ and $_a$ denote the ordinary and extraordinary optical waves and the acoustic wave, respectively. This will be the case if the optical and RF acoustic frequencies $f_o$ and $f_a$ are related by:

$$f_0 = \frac{cf_a}{V|\Delta n|} \quad (1)$$

where $c/V$ is the ratio of the optical velocity in vacuum to the acoustic velocity in the medium, and $\Delta n$ is the birefringence of the crystal.

The half power bandwidth of the pass band through the optical filter is defined by the following relation:

$$B.W. \cong \frac{1}{|\Delta n|L} cm^{-1} \quad (2)$$

where B.W. is the half power bandwidth in wave number or waves per centimeter of the pass band, L is the interaction length of the optical and acoustic fields within the crystal, and $\Delta n$ is the birefringence of the crystal.

Figure 2:
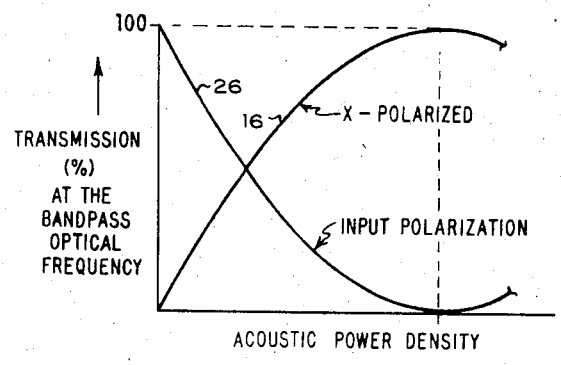
FIG. 2 is a plot of transmission in percent at the bandpass optical frequency of the filter versus acoustic power density in the acousto-optic element of the filter for filtered light of the same polarization as the input light and for filtered light of a crossed polarization to the input light.

The percent light transmission through the optical filter 1 at the band-pass optical frequency $f_o$ has a characteristic as shown in FIG. 2. More specifically, the percentage of light at the band-pass optical frequency $f_o$ that is shifted from the input polarization to the cross polarization is shown by curve 16 as a function of the acoustic power density within the crystal 2. Thus, output beam 14 has a transmission characteristic as a function of acoustic power density as shown by curve 16.

If a quartz piezoelectric crystal 2 is employed, it is preferably cut for a thickness shear or thickness extensional mode of resonance to provide the highest possible Q for the acoustic or vibrational mode of resonance. Since the energy in the standing wave is Q times the energy loss per cycle, a substantial increase in efficiency can be expected through the use of a high Q resonance mode. The acoustic frequency required to generate a pass band in the optical spectrum for typical birefringent materials is in the 10's to 100's of megahertz. If the crystal is cut to a thickness to support a fundamental mode of resonance, the crystal, in the case of quartz, becomes extremely thin. As a consequence, a substantial increase in the required acoustic power for 100 percent transmission at the band-pass frequency is required since the acoustic power density required for 100 percent transmission varies as $1/L^2$. Therefore, operation on a higher overtone order is preferred even though the coupling coefficient is decreased.

Each of the three thickness modes exhibit odd ordered overtones, each of which may be excited to generate a pass band in the optical spectrum corresponding to the associated acoustic frequency for each overtone of the thickness modes of vibration. Thus, a comb of optical frequencies which are approximately proportional to the odd integers, in frequencies, can be simultaneously or separately transmitted through the optical filter element by exciting selectively the piezoelectrically driven resonances. For example, in quartz, a thickness shear Y-cut crystal with a thickness of approximately 1.5mm can be driven on the ninth, 11th and 13th overtones to transmit various different colors or optical frequencies, such as red, yellow, and blue in the visible spectrum. In another example, a quartz crystal having a thickness of 1.398mm may be excited on the 11th 13th and 17th overtones for producing band-pass frequencies in the red, green, and blue colors, respectively, at wavelengths of 6465 A, 5471 A, and 4183 A, respectively. The width of the pass band between half power points for such a crystal at a wavelength of 5893 A, corresponding to a yellow optical frequency, is approximately 272 A. Thus, in the foregoing example, it is seen that the acousto-optic filter may be sequentially energized at the acoustic frequency corresponding to the 11th, 13th and 17th overtones to sequentially or simultaneously transmit red, green and blue colors as output beam 14. By adjusting the amplitude of the vibrations of the overtone crystal 2, the amount of red, green and blue colors may be controlled. The three overtones may be excited simultaneously or sequentially to obtain nearly any desired color output by mixing proper amounts of red, green and blue during the transmission period.

In the design of an acousto-optic filter 1 to transmit a specific color, a crystal material is chosen with optical transmission at that particular wavelength, preferably with a large piezoelectric constant and with large acousto-optic constant and small birefringence. The acoustic frequency is determined from Equation (1). The remaining parameter is the overtone order. This is chosen in order to provide the desired bandwidth for the filter. If a broad bandwidth filter is desired, a relatively small thickness will be chosen and the acoustic frequency is generated by a piezoelectrically excited resonance on a relatively low order overtone, whose frequency matches the desired acoustic frequency. Thus, the thickness is determined, in the course, to match the bandwidth and, in the fine, to provide a submultiple required frequency. If a narrow bandwidth is desired, the resonator would be chosen with a relatively large thickness and the overtone order would be increased.

In the acousto-optic light filter 1 of FIG. 1, acoustic resonator or vibrator 2 may be driven at its acoustic resonance frequency via a frequency supplied from a signal generator 7. However, as an alternative, the acoustic resonator or vibrator 2 may be utilized as the frequency determining element of the driving circuit and the frequency or signal generator 7 may be replaced by a simple amplifier with positive feedback through the frequency determining crystal 2. In such a case, the filter merely oscillates at the acoustic vibration frequency of the crystal resonator 2. Tuned electric filter elements, not shown, may be utilized for selecting the particular overtone frequency to be excited. Such additional tuned circuits may be paralleled in lines 5 or 6 with suitable gates for selecting one or more of the filter elements to be connected in circuit with the resonator for selecting a particular desired overtone resonance.

Figure 3:
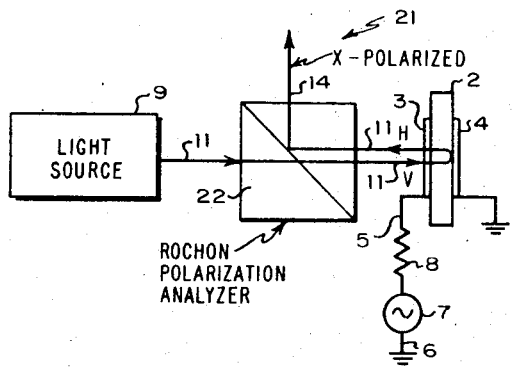
FIG. 3 is a schematic line diagram, partly in block diagram form, depicting an alternative acousto-optic light filter incorporating features of the present invention.
Figure 7:
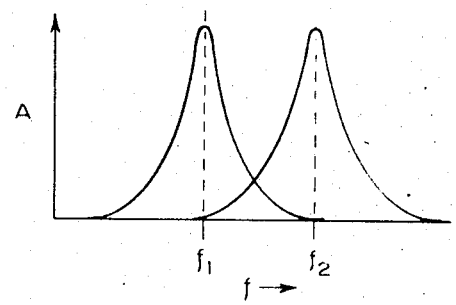
FIG. 7 is a plot of amplitude versus frequency of mechanical vibration depicting adjacent modes of resonance of adjacent crystal vibrators in the array of FIGS. 5 and 6.

Referring now to FIG. 3, there is shown an alternative acousto-optic filter 21 incorporating features of the present invention. Light filter 21 is similar to the acousto-optic filter disclosed in the aforecited Applied Physics Letter article, Volume 15 of 15 Nov. 1969. The acousto-optic element is substantially the same as that previously described in FIG. 1, with the exception that electrode 4 is made reflective such that the incident light beam, as vertically polarized by a Rochon polarization prism 22, is reflected after passage through the resonator 2 such that the diffracted output beam 11 is directed back into the prism 22. Prism 22 is arranged such that light of crossed polarization to the input light is reflected as an output beam 14. Thus, output beam 14 has the band-pass characteristics as shown by curve 16 of FIG. 2.

Figure 4:
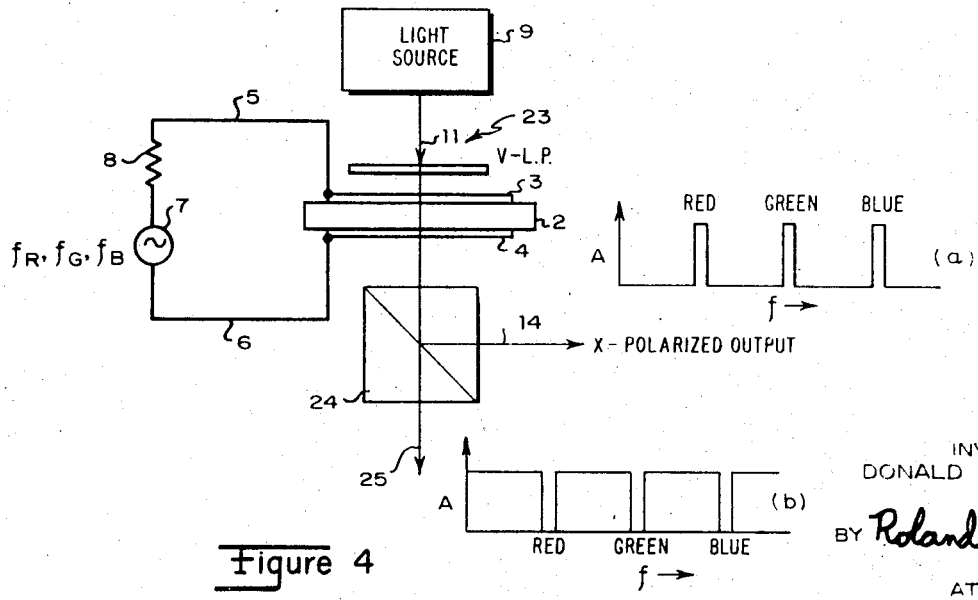
FIG. 4 is a schematic line diagram, partly in block diagram form, depicting another alternative acousto-optic light filter incorporating features of the present invention.

Referring now to FIG. 4, there is shown still another alternative embodiment of the present invention. Acousto-optic light filter 23 of FIG. 4 is substantially the same as that previously described with regard to FIG. 1 with the exception that the output polarization analyzer 13 has been replaced by a Rochon polarization analyzer or prism 24. Prism 24 is arranged such that the light having the same polarization as the input light beam 11 passes through the Rochon prism 24 as output beam 25, whereas light of the crossed polarization orthogonal to the input polarization is reflected from the prism 24 as output beam 14. Output beam 14 has the band-pass characteristics as shown by curve 16 of FIG. 2, whereas output beam 25 has the transmission characteristics as shown by curve 26 of Figure 2 at the bandpass optical frequency. Thus, the frequency generator 7 generates acoustic frequencies $f_R$, $f_G$ and $f_B$ corresponding to related band-pass optical frequencies $f_0$ in the red, green and blue spectrum, respectively. The output spectrum for output beam 14 will have spectral characteristics as shown by the spectral diagram (a), whereas output beam 25 will have spectral characteristics as shown by spectral diagram (b).

Figure 5:
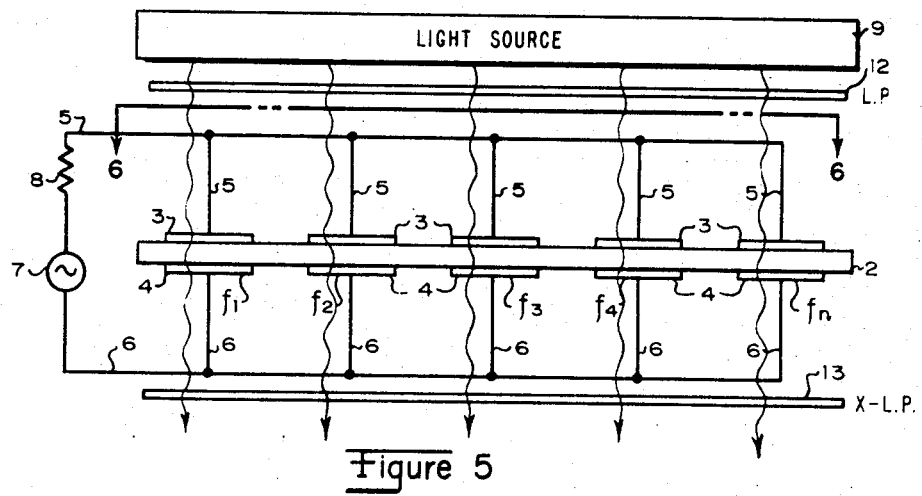
FIG. 5 is a schematic line diagram, partly in block diagram form, depicting an array of acousto-optic light filters incorporating features of the present invention.
Figure 6:
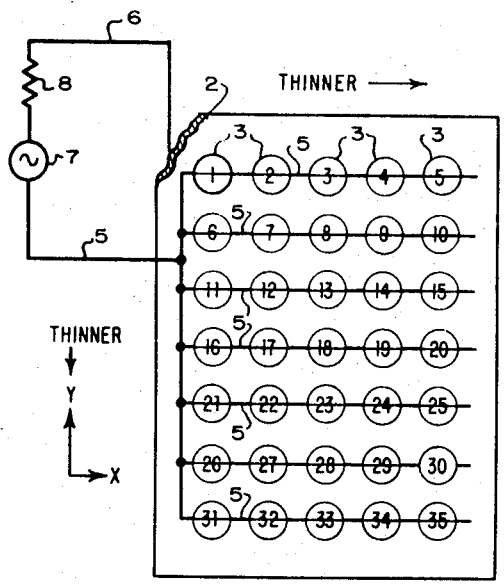
FIG. 6 is a reduced schematic line diagram of the structure of FIG. 5 taken along line 6-6 in the direction of the arrows.

Referring now to FIGS. 5 and 6 there is shown an alternative embodiment of the present invention. The apparatus of FIGS. 5 and 6 is substantially the same as that described above with regard to FIG. 1 with the exception that an array of such acousto-optic filters 1 has been provided on a single substrate crystal 2. Heretofore, plural acoustic resonators or vibrators have been provided in a single crystal substrate as exemplified by the teachings of the aforecited articles appearing in the 1967 I.E.E.E. International Convention Record and the Proceedings of the 17th Annual Frequency Control Symposium. Briefly, the individual crystal vibrator or acoustic resonator portions can take one of two different basic configurations. In a first configuration, which is known as the "mesa" configuration, thin electrodes 3 and 4 are deposited in a dot pattern on opposite sides of the substrate 2, such electrodes being in transverse registration with each other.

The substrate 2 is dimensioned to have a thickness in between the electrode portions 3 and 4 which is greater than the thickness of the wafer or crystal 2 in the region immediately surrounding each of the crystal resonators or vibrators. In the mesa configuration, the physical loading of the crystal resonator or vibrator is negligible.

In the second resonator configuration, the electrodes 3 and 4 have a thickness which is sufficient to provide a substantial physical loading to the crystal vibrator portion disposed between the electrodes. The loading is sufficient such that the acoustic frequency or vibrator frequency is substantially lower, for its particular thickness mode of resonance, than the immediately adjacent regions of the crystal surrounding the particular vibrator.

For either the mesa or loaded type configuration, the region of the crystal between adjacent resonators or vibrators constitutes the region of the crystal 2 which is cut-off for the particular thickness mode of resonance of the vibrator. This phenomenon has become known as "energy trapping" since the acoustic resonance energy, in such a case, is trapped within the individual resonator or vibrator portions of the common substrate 2.

The Q for the acoustic resonators or vibrators can be extremely high, on the order of $10^5$. Each of the resonators is tuned for a slightly different frequency. More particularly, in a preferred embodiment, each acoustic resonator or vibrator is separated in frequency from all other vibrators by at least the resonance width, i.e., 1/Q. In such a case, it is possible to generate several thousand independent acoustic resonators or vibrators on a single substrate 2, each distinguished from all others by its resonant frequency. For example, in a material and at frequencies for which the Q value is $10^5$, 1,000 discrete resonators are prepared on a single substrate with a total frequency spectrum of only 1 percent. The exciting frequency can be used to address the particular resonator which is to be excited.

In an array with 30 resonators in the X direction and 30 resonators in the Y direction, arranged in rows and columns, each resonator having a Q in excess of $10^5$, then each resonator in the first row would be separated from its nearest neighbor by $10^{-5}$ of the resonant frequency. Thus, the frequency of the last resonator in a row would be separated in frequency from the first resonator in the row by $3 \times 10^{-4}$ Hz. The beginning of the next row is separated in frequency from the last member of the preceding row by $1 \times 10^{-5}$, the total array is addressable with appropriate digital designation of rows and columns. A decimal designation of the address indicates the rows by the least significant figures and the columns by the more significant figure. In a 10 × 10 array, for example, the last or least significant digit would be utilized to designate the particular resonator in a row while the next significant digit would be utilized to designate the column. Since rather large arrays can be generated using a very small portion of the frequency spectrum to designate the address, multiple overtones may be excited, as described above, to transmit different colors. Thus, in a two-dimensional array, as shown in FIG. 6, the row and column position as well as the color are addressable by frequency. The frequency of the signal generator 7 is programmed to produce a desired color display as viewed to observe the filtered output light.

Since each vibrator or acoustic resonator has a finite acoustic Q, the display has a short-term memory. By multiplexing the frequency from the generator 7, as applied to the array, various resonators are sequentially excited. This makes possible a passive display utilizing available light, or, if desired, a very brilliant display using bright light sources 9. As an alternative, each of the acoustic resonators or vibrators is made to operate in the reflective mode as previously described above with regard to FIG. 3 to obtain a display utilizing the reflected light.

In a 35 element array, as shown in FIG. 6, the first mechanical vibrator or acoustic resonator, designated by numeral 1, is designed to operate on the 13th overtone of the thickness mode at, for example, 50 megahertz. In such a case, the crystal substrate 2, at this corner, would have a thickness of approximately 0.01718600 inch, assuming a quartz substrate 2. The fifth mechanical vibrator or acoustic resonator would have a resonance frequency of 50.005 megahertz and the crystal substrate 2 would have a thickness, at this point, of 0.01718428 inch. More particularly, this edge of the crystal 2 would have a thickness $1.72 \times 10^{-6}$ inches thinner than the edge near the first resonator 1. The 31st resonator would have a resonance frequency of 50.031 megahertz and the crystal would be 0.01717535 inch thick at this point being $10.65 \times 10^{-6}$ inches thinner than the thickness of the crystal 2 at the first resonator. The 35th resonator would have a resonance frequency of 50.035 megahertz and a thickness at this point of 0.01717397 inch which is $12.03 \times 10^{-6}$ inches thinner than the crystal at the first resonator.

Figure 8:
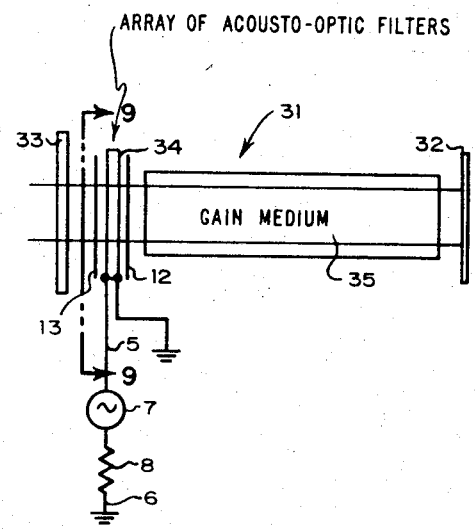
Figure 8 is a schematic line diagram of a multiaperture laser incorporating features of the present invention.
Figure 9:
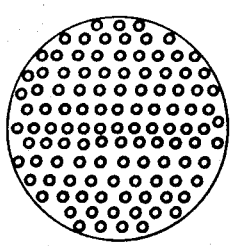
FIG. 9 is an enlarged sectional view of the structure of FIGS. 8 and 10 taken along line 9-9 in the direction of the arrows.

Referring now to FIGS. 8 and 9, there is shown an alternative embodiment of the present invention. In the structure of FIG. 8, an array of acousto-optic filters (see FIG. 9) each tuned to a different frequency such as that previously described with regard to FIGS. 5 and 6 is disposed in the light path of an optical resonator of a laser (optical maser) 31. Briefly, the optical maser 31 includes a pair of spaced mirrors 32 and 33, mirror 33 being only partially reflective such that a small percentage of the light reaching output mirror 33 passes therethrough as an output beam. In such a case, the reflectivity of the mirror 33 may be on the order of 99 percent with one percent passing out of the optical resonator as the output beam. The array of acousto-optic filters 34 is disposed in the optical path of the optical resonator between mirrors 32 and 33 and a suitable gain medium 35, such as a mixture of helium-neon, argon, or the like, or organic dyes, such as Rhodamine 6G, excited with a DC discharge or by a radio frequency discharge, is also provided in the optical resonator. The frequency of excitation supplied to the array of acousto-optic filters is varied to address selected ones of the acoustic resonators or vibrators for determining the position of the output beam of the optical maser 31.

Figure 10:
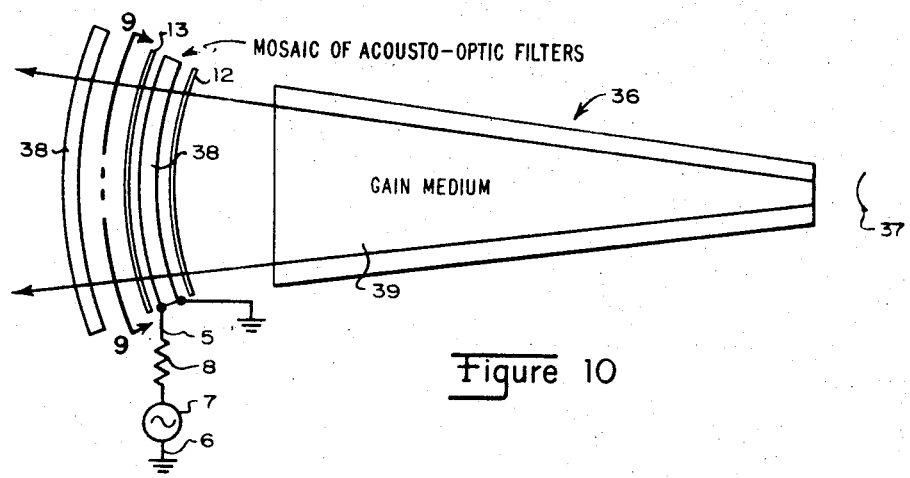
FIG. 10 is a schematic line diagram of an alternative multi-aperture laser incorporating features of the present invention.

Referring now to FIGS. 9 and 10, there is shown an optical maser 36 incorporating features of the present invention. The structure of FIG. 10 is substantially the same as that of FIG. 8 with the exception that the mirrors 37 and 38 forming the ends of the optical resonator are sections of spheres and the array of acousto-optic filters (see FIG. 9) is provided in a spherical sectional array 38. The gain medium is disposed in the optical resonator between the acousto-optic filters 38 and the mirror 37. The output beam of the optical maser 36 is steerable by addressing a selected one of the acousto-optic filter elements within the mosaic or array 38.

Figure 11:
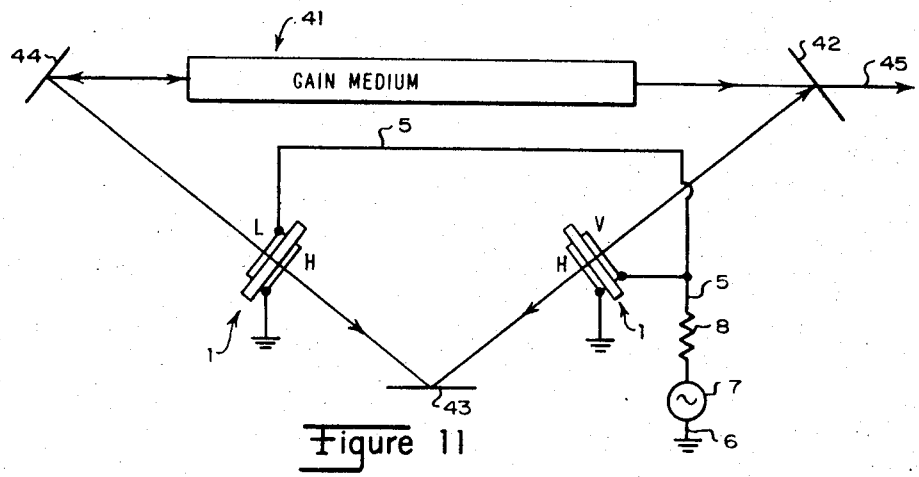
FIG. 11 is a schematic line diagram of a ring laser incorporating features of the present invention.

Referring now to FIG. 11, there is shown a ring laser 41 incorporating features of the present invention. The optical resonator for the optical maser 41 is defined by three mirrors 42, 43 and 44 disposed at the corners of a triangle for reflecting the optical beam of the optical maser 41 in a closed loop. Output mirror 42 is partially reflective to permit a relatively small amount of the light incident thereon to pass therethrough as output beam 45. A pair of acousto-optic filters 1, as previously described with regard to FIG. 1, are disposed in the light path of the optical resonator and are tuned for the same band-pass frequency and excited with the same excitation frequency obtained from frequency generator 7. The filters 1 are preferably driven with sufficient acoustic power density, within the acousto-optic device or crystal, such that substantially 100 percent transmission is obtained at the bandpass frequency. The bandpass optical frequency of the acousto-optic filters 1 is chosen at the desired laser optical frequency of the maser 41. Different overtones of the crystals within the acousto-optic filters may be excited for obtaining different color light outputs for beam 45.

Figure 12:
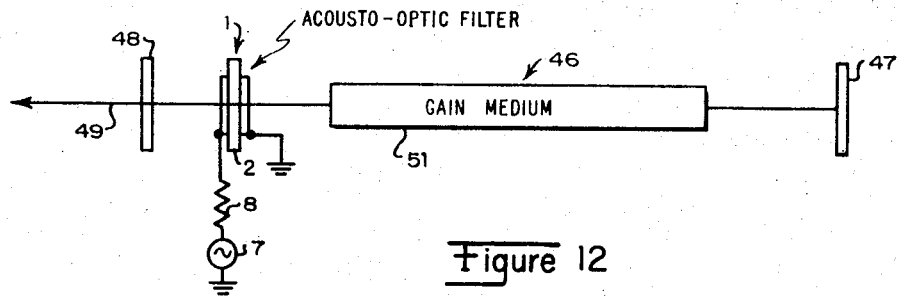
FIG. 12 is a schematic line diagram of a tunable laser incorporating features of the present invention.
Figure 13:
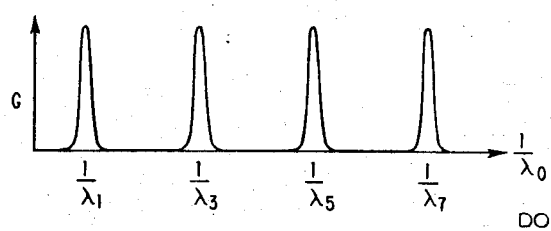
FIG. 13 is a plot of gain versus optical wavelength $1/\lambda$ for the laser of FIG. 12.

Referring now to FIG. 12, there is shown an optical maser 46 incorporating features of the present invention. More particularly, the optical maser 46 includes an optical resonator defined by the space between mirror 47 and output mirror 48. Output mirror 48 is only partially reflective to permit a relatively small percentage as of one percent of the light incident thereon to pass therethrough as output beam 49. A gain medium 51 and an acousto-optic filter 1 of the type previously described with regard to FIG. 1 are disposed in the optical resonator between mirrors 47 and 48. The optical maser 46 is tunable over a relatively wide range of output optical frequencies in discrete optical wavelengths according to different excited overtones of the crystal 2 in the acousto-optic filter 1. An output is shown in FIG. 13 wherein the gain of the maser is depicted as a function of the reciprocal of the optical wavelength of the output beam 49. $\lambda_1$, $\lambda_3$, $\lambda_5$, $\lambda_7$, and $\lambda_n$ correspond to different odd overtones n, where n is an odd integer, of the crystal 2 utilized in the acousto-optic filter. The output beam is tuned to these various output frequencies by energizing the corresponding overtone of the crystal 2.

As used herein, "light" is defined to mean electromagnetic radiation. Such light need not be confined to the visible spectrum. The benefits of collinear diffraction are: 1) the stringent angular tolerance characteristic of Bragg diffraction is relaxed. Angular divergence of the incident light beam contributes only a second order shift in the pass band which is a cosine of the angle between the acoustic K vector and the incident optical K vectors; 2) the interaction volume of the acoustic and optical beams is enhanced because of the collinear propagation; therefore, the efficiency of light conversion can be increased to nearly 100 percent and the acoustic power required for efficient conversion drastically decreased.

In some birefringent crystals the phase velocity K vector and the group velocity are not collinear. The angle between them may be as much as 20°, as in the case of quartz. In such a case, the light beam may be collinear with either the phase or the group velocity with corresponding advantages and disadvantages.

If the light beam is collinear with the phase velocity, the advantage of cosine dependence of bandwidth center frequency upon divergence is retained with the disadvantage that the light beam soon walks out of the acoustic beam because the energy propagates in the direction of the group velocity and is not collinear with the light beam.

On the other hand, if the light beam is made collinear with the group velocity, the advantage of efficient utilization of acoustic energy is retained but the angle between the acoustic K vector and the optical K vector is no longer zero and the shift in the center of the optical pass band with divergence in the optical beam is a function of the cosine of the angle between the acoustic and optical K vectors which is no longer zero. This results in a wider pass band with the same angular divergence. In intermediate cases where propagation is neither exactly collinear with either the phase or the group velocity, corresponding tradeoffs occur. In those birefringent crystals in which the phase velocity and group velocity are collinear, non-collinear propagation of light in the filter contributes similar deleterious effects to the filter. Therefore, as used herein, substantially collinear means that the light and acoustic K vectors are sufficiently collinear to retain the advantage of efficient acoustic power utilization consistent with the required pass band filter characteristics.

As seen from Equation (2), the bandwidth of the acousto-optic filter is inversely related to the length of the interaction path L through the crystal. In resonant acousto-optic filters, the path length can be relatively short and, thus, the bandwidth is relatively wide. In such cases, the K vectors for the optical and acoustic waves can have substantial divergence while still retaining the benefits of collinear diffraction since the acousto-optic interaction is relatively high Q and the interaction falls off only as the cosine of the angle of divergence.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. An acousto-optic method for filtering light, said method comprising the steps of applying a radio frequency electric field to a piezoelectric optically anisotropic medium to excite an acoustic wave therein at the frequency of the applied radio frequency electric field and at a frequency related to the optical frequency of the light to be filtered, substantially collinearly diffracting an incident light beam on the acoustic wave within the piezoelectric optically anisotropic medium to change light of a first polarization and of the optical frequency of the light to be filtered into light of a second polarization, and analyzing the diffracted light beam to separate light of the second polarization from light of the first polarization, whereby light at the optical frequency related to the frequency of the acoustic wave is filtered from the incident light beam.

2. The method of claim 1 wherein the step of applying the radio frequency electric field to the piezo-electric optically anisotropic medium comprises applying a radio frequency electric potential across a pair of spaced electrodes disposed adjacent to opposite sides of the piezoelectric medium.

3. The method of claim 2 wherein at least one of said electrodes is substantially transparent to the incident light beam, and wherein the step of diffracting the incident light beam on the acoustic wave includes directing the incident light beam through the substantially transparent electrode into the piezoelectric optically anisotropic medium.

4. The method of claim 1 including the step of dimensioning the piezoelectric optically anisotropic medium to have a resonant mode of vibration at the frequency of the applied radio frequency electric field.

5. The method of claim 1 wherein the piezoelectric optically anisotropic medium is a crystal plate of a thickness providing a thickness mode of vibration at the frequency of the applied radio frequency electric field.

6. The method of claim 5 wherein the thickness of the crystal plate is dimensioned to have an overtone thickness mode of vibration at the frequency of the applied radio frequency electric field.

7. The method of claim 6 wherein the step of applying the radio frequency electric field to the piezoelectric optically anisotropic medium comprises sequentially applying a radio frequency electric field of different frequencies corresponding to the frequencies of different overtone thickness modes of vibration of the crystal plate to the crystal plate to sequentially excite different overtones of the crystal plate and thereby sequentially diffract light of correspondingly different optical frequencies from the first polarization into the second polarization.

8. The method of claim 5 including the steps of arranging a plurality of such crystal plate vibrators in a spatially separated array and dimensioning each of these crystal plate vibrators for a thickness mode of vibration at a different frequency, directing the light to be filtered into the array of crystal plate vibrators, applying the radio frequency electric field to the array of crystal plate vibrators, and varying the frequency of the applied radio frequency electric field to excite resonance of different ones of the array of crystal plate vibrators in accordance with the frequency of the applied radio frequency electric field and thereby produce a corresponding spatial separation of the light diffracted from the first polarization into the second polarization.

9. The method of claim 8 wherein the crystal plate vibrators are arrayed in an ordered matrix according to an ascending or descending order of resonant vibration frequency.

10. The method of claim 8 wherein the crystal plate vibrators are formed in a common crystalline plate and are each spaced from adjacent crystal plate vibrators by regions of the crystalline plate that are cut-off for the frequencies of the resonant modes of the adjacent crystal plate vibrators to provide energy trapping in each crystal plate vibrator excited by a radio frequency electric field at a resonant frequency of the excited crystal plate vibrator.

11. The method of claim 4 including the step of positioning the piezoelectric optically anisotropic medium in a light path within an optical resonator for filtering light within this light path of the optical resonator.

12. An acousto-optic method for filtering light, said method comprising the steps of disposing an array of optically anisotropic acoustic resonators in the path of the light to be filtered, such resonators being arrayed in a plane generally transverse to the path of the light to be filtered, exciting one or more of the acoustic resonators into resonance for diffracting light of a first polarization and of an optical frequency related to an acoustic resonance frequency of each excited acoustic resonator into light of a second polarization, and polarization analyzing the diffracted light to separate the light of the first polarization from the light of the second polarization.

13. The method of claim 12 wherein the acoustic resonators are crystal vibrators, and wherein the method includes the steps of arranging the crystal vibrators in a common crystalline slab, dimensioning each of the crystal vibrators for a thickness mode of vibration at a different frequency such that the crystal vibrators are addressable by different frequencies of excitation, and dimensioning the regions of the common crystalline slab surrounding each crystal vibrator to trap acoustic energy at a resonant frequency of the respective crystal vibrator when it is excited.

14. An acousto-optic filter for filtering light, said filter comprising a piezoelectric optically anisotropic medium, means for applying a radio frequency electric field to the piezoelectric optically anisotropic medium to excite an acoustic wave therein at the frequency of the applied radio frequency electric field and at a frequency related to the optical frequency of the light to be filtered, said piezoelectric optically anisotropic medium being disposed for substantially collinearly diffracting an incident light beam on the acoustic wave therein to change light of a first polarization and of the optical frequency of the light to be filtered into light of a second polarization, and means for analyzing the diffracted light beam to separate light of the second polarization from light of the first polarization, whereby light at the optical frequency related to the frequency of the acoustic wave is filtered from the incident light beam.

15. The filter of claim 14 wherein said means for applying the radio frequency electric field to the piezoelectric optically anisotropic medium includes a pair of spaced electrodes disposed adjacent to opposite sides of the piezoelectric optically anisotropic medium.

16. The filter of claim 15 wherein at least one of said electrodes is substantially transparent to the incident light beam, and said piezoelectric optically anisotropic medium is disposed relative to the incident light beam for directing the incident light beam through the substantially transparent electrode into the piezoelectric optically anisotropic medium.

17. The filter of claim 14 wherein said piezoelectric optically anisotropic medium is dimensioned to have a resonant mode of vibration at the frequency of the applied radio frequency electric field.

18. The filter of claim 17 wherein said piezoelectric optically anisotropic medium is a crystal plate having a thickness dimensioned to provide a thickness mode of vibration at the frequency of the applied radio frequency electric field.

19. The filter of claim 18 wherein the thickness of said crystal plate is dimensioned to have an overtone thickness mode of vibration at the frequency of the applied radio frequency electric field.

20. The filter of claim 19 wherein said means for applying a radio frequency electric field to the piezoelectric optically anisotropic medium includes means for sequentially generating and applying radio frequency electric fields of different frequencies corresponding to the frequencies of different overtone thickness modes of vibration of the crystal plate to the crystal plate to sequentially excite different overtones of the crystal plate and thereby sequentially diffract light of correspondingly different optical frequencies from the first polarization into the second polarization.

21. The filter of claim 18 including a plurality of such crystal plate vibrators arranged in a spatially separated array disposed so that the light to be filtered is directed into the array of crystal plate vibrators, each of the crystal plate vibrators being dimensioned for a thickness mode of vibration at a different frequency, means for applying a radio frequency electric field to the array of crystal plate vibrators, and means for varying the frequency of the applied radio frequency electric field to excite resonance of different ones of the array of crystal plate vibrators in accordance with the frequency of the applied radio frequency electric field to produce a corresponding spatial separation of the light diffracted from the first polarization into the second polarization.

22. The filter of claim 21 wherein said crystal plate vibrators are arrayed in an ordered matrix according to an ascending or descending order of resonant vibration frequency.

23. The filter of claim 21 wherein said crystal plate vibrators are formed in a common crystalline plate, each of said crystal plate vibrators being spaced from adjacent crystal plate vibrators by regions of the common crystalline plate that are cut-off for the frequencies of the resonant modes of the adjacent crystal plate vibrators to provide energy trapping in each crystal plate vibrator excited by a radio frequency electric field at a resonant frequency of the excited crystal plate vibrator.

24. The filter of claim 17 including an optical resonator, said piezoelectric optically anisotropic medium being disposed in a light path within the optical resonator for filtering light within this light path of the optical resonator.

25. An acousto-optic filter for filtering light, said filter comprising an array of optically anisotropic acoustic resonators, said acoustic resonators being disposed in the path of the light to be filtered and being arranged in a plane generally transverse to the direction of the light to be filtered, means for exciting one or more of the acoustic resonators into resonance for diffracting light of a first polarization and of an optical frequency related to an acoustic resonance frequency of each excited acoustic resonator into light of a second polarization, and means for analyzing the polarization of the diffracted light to separate the light of the first polarization from the light of the second polarization.

26. The filter of claim 25 wherein said acoustic resonators are crystal vibrators arranged in a common crystalline slab, each of said crystal vibrators is dimensioned for a thickness mode of vibration at a different frequency such that the crystal vibrators are addressable by different frequencies of excitation, and said common crystalline slab is dimensioned in the regions between adjacent crystal vibrators to trap exciting energy at a resonant frequency of each crystal vibrator when it is excited.

27. An acousto-optic filter for filtering light, said filter comprising a piezoelectric optically anisotropic medium disposed to receive an incident light beam having a first predetermined polarization, said piezoelectric optically anisotropic medium being selected and arranged to propagate the incident light beam as a particular wave in a birefringent system and being further capable of diffracting and propagating a light beam of orthogonal polarization to the incident light beam as another wave in the birefringent system in response to acoustic waves excited within the piezoelectric optically anisotropic medium, means for coupling radio frequency electric fields into the piezoelectric optically anisotropic medium to develop acoustic waves of a predetermined frequency therein, the frequency of the acoustic waves being selected to define a phase-matched relationship such that the vector sum of the momentum vectors of the incident light beam and the acoustic waves is equal to the momentum vector of a resultant output light beam orthogonally oriented to the incident light beam, whereby the incident light beam satisfying that condition for an acoustic wave of the predetermined frequency is diffracted into said orthogonal polarization, and means for analyzing the diffracted light beam to separate light of said orthogonal polarization from light of said first predetermined polarization, whereby light of said orthogonal polarization is filtered from the incident light beam.

* * * * *